FIG. 2.
TRUTH TABLE
CHARGE TOTALIZER CHARGING CONTROL
|  | FLOAT | TRANSITION TO DISCHARGE | DISCHARGE | TRANSITION TO MAIN CHG. | MAIN CHARGE | TRANSITION TO TOPPING | TOPPING | TRANSITION TO FLOAT | FLOAT |
|---|---|---|---|---|---|---|---|---|---|
| SENSE RELAY 1K1 | X | O | O | O | O | X | X | X | X |
| COULOMETER RELAYS 1K2 | O | O | O | O | O | O | O | X | O |
| CHARGE RELAY 1K3 | O | O | X | X | X | X | X | X | O |
| COULOMETER SIGHT | O | O | O | O | O | O | X | X | O |
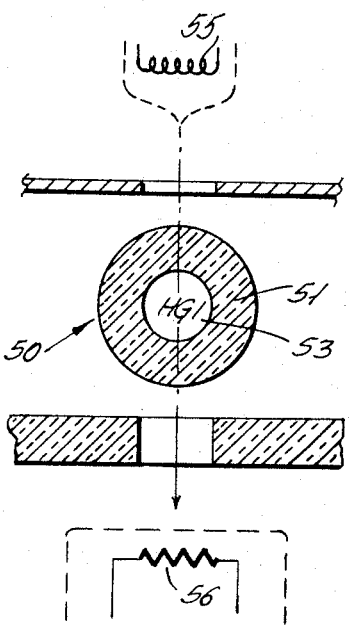
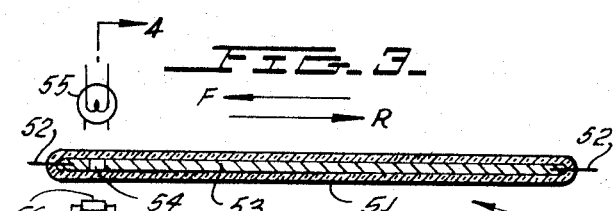
FIG. 3.
FIG. 4.
INVENTOR.
I. J. SOBEL
BY
OSTROLENK, FABER, GERB & SOFFEN
ATTORNEYS 3,329,882
**COULOMETER CONTROLLED BATTERY
CHARGING SYSTEMS**
Ilyitch Jacob Sobel, White Plains, N.Y., assignor to Sonotone Corporation, Elmsford, N.Y., a corporation of New York
Filed Oct. 22, 1964, Ser. No. 405,898
7 Claims. (Cl. 320—39)

ABSTRACT OF THE DISCLOSURE

A constant-current battery charging system has a rectified charging circuit energized by an alternating power supply. The charging circuit includes at least two electrodes of a charging transistor connected through one winding of a saturable core transformer with the third transistor electrode connected to the rectified current supply circuit. The transformer is periodically saturated by the charging current and selectively applies through one of its transformer windings on-bias and off-bias to the charging circuit transistor for producing continuous oscillations for charging the battery during the on-bias cycle period. The charging circuit has charge totalizing means set into operation by battery sensing circuits for supplying to the battery first a predetermined totalized main charge and thereafter a further correlated charge during which the charge totalizing means thereafter returns to its original position. The charge totalizing means consists of either a coulometer or a timer.

---

This is a continuation-in-part of application Ser. No. 192,936, filed May 7, 1962.

This invention relates to battery charging systems and, more specifically, to systems for charging nickel-cadmium batteries or analogous alkaline batteries with a constant charging current. In a nickel-cadmium battery, the discharge active electrode mass consists of nickel (II) hydroxide—$Ni(OH)_2$ which when charged is converted into nickel (III) hydroxide. The discharged negative electrode mass consists of cadmium (II) hydroxide which when charged is converted into metallic cadmium. The two electrodes undergo opposite electrochemical reactions when they are discharged. The negative electrode usually has a larger charging capacity than the positive electrode.

Because of different rates of charge acceptance between the positive and negative electrodes of such batteries, difficulties have been encountered in assuring that such batteries be brought rapidly from a discharged state to a fully charged state. In a fully charged state such battery has a voltage of 1.5 volts per cell.

The invention is based on the discovery to assure that a nickel cadmium battery is fully charged it has to be supplied not only with a main charge which raises the battery voltage to 1.5 volts per cell, but also with a further topping charge which raises the battery voltage to approximately 1.65 to 1.68 volts per cell.

In accordance with the invention, the sensing means responsive to a substantial or large drop of the battery voltage, for instance 1.3 volts per cell, starts a battery charging operation carried on under control of a coulometer device responsive to flow of charge in one direction to bring it to one coulometer setting and responsive to flow of charge in opposite direction to bring it to the opposite setting. Upon the battery sensing means starting a full charging operation, a main charge is first supplied to the battery, at least part of which passes through the coulometer and brings it from an initial one setting to the opposite coulometer setting. Upon reaching the opposite setting, the coulometer is automatically connected to pass a portion of a further topping charge in opposite direction until the coulometer reaches its initial setting whereupon it automatically stops the topping charge and therewith the battery charging cycle.

In the charging system of the present invention the forward operation of simple coulometer means is utilized from an initial operating state for totalizing the main charge delivered to the battery and raise its voltage to the initial normal level, whereupon the desired amount of the topping charge is supplied to the battery under control of the reverse operation of the coulometer means as it is being returned to its initial state to raise the battery voltage to the desired normal level, for example, to 1.3' volt per cell. Further, in accordance with the invention, the coulometer controlled main and topping charges are initiated only in response to the drop of the battery voltage to a predetermined substantially lower level, for example to 1.3 volt per battery cell. In addition, small drops of the battery voltage for example to 1.4 volt per cell, initiate a limited recharge which raises the battery voltage to this desired normal level for example to 1.5 volt per cell.

The foregoing and other objects of the invention will be best understood from the following description of the exemplifications thereof, reference being had to the accompanying drawings, wherein:

FIG. 2 is the Truth Table listing in successive lines of the first row the different control relays of the system of FIG. 1 and giving in successive rows the operating conditions of the charging system identified by the legend on the top of each row;

FIG. 3 is a diagrammatic view of one form of commercially available coulometers which may be used in a charging system of the invention such as shown in FIG. 1.

FIG. 4 is a cross-sectional diagrammatic view of the coulometer of FIG. 3 along lines 4—4.

Figure 1:
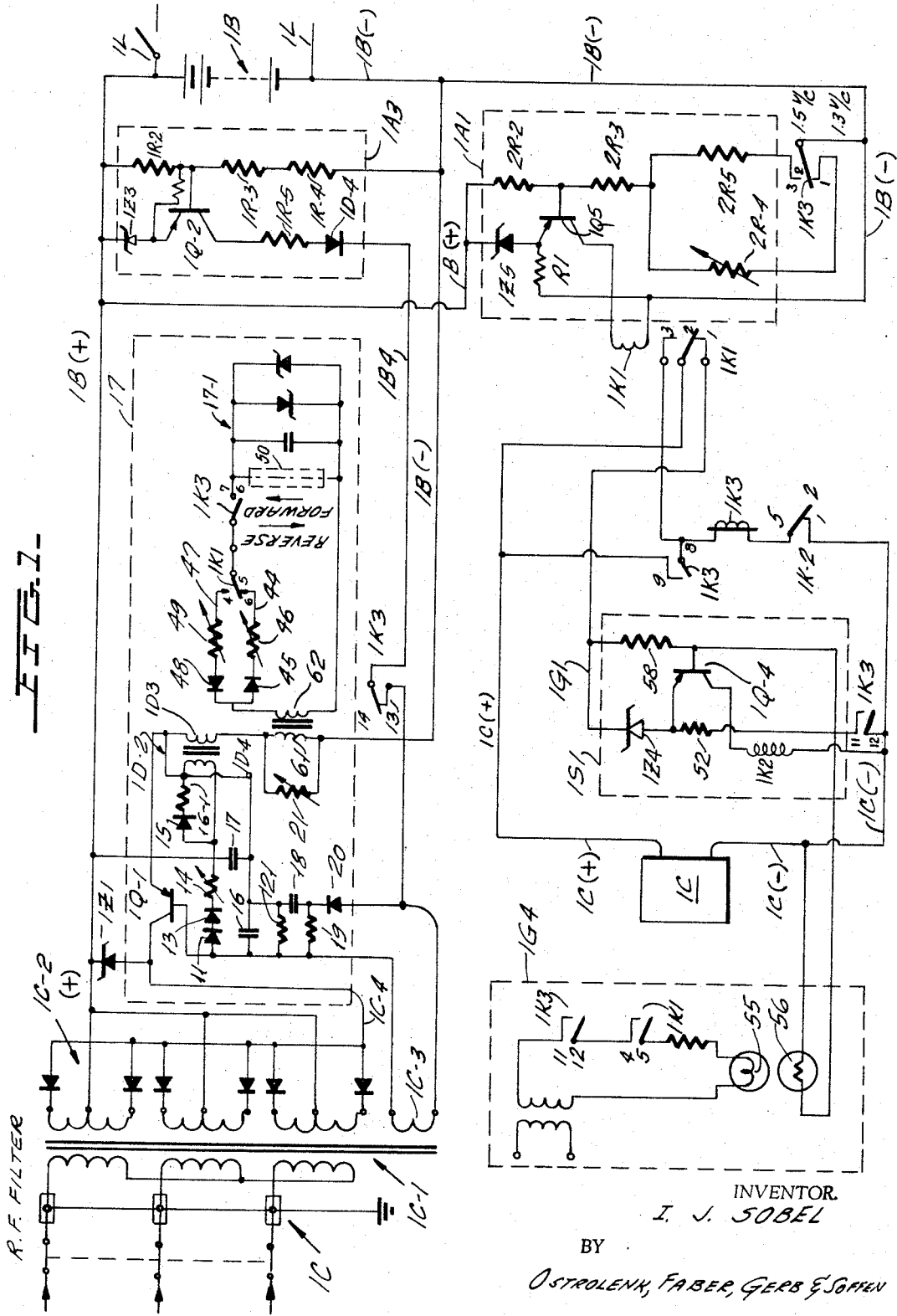
FIG. 1 is a circuit diagram of one form of battery charging system exemplifying the invention.

It should be noted that features of the charging system described in connection with FIGS. 5 to 7 have also been described in my Patent 3,230,439, issued Jan. 18, 1966 of which the present application is a continuation-in-part.

The description of the systems of the invention of their component elements given herein conforms to accepted defense service standards. In accordance with such accepted standards, individual pair of cooperating switch contacts of a relay for example, switch contacts 1 and 2 of relay 1K will be designated 1K–1, 2. Furthermore, the circuits show all relays in de-energized condition except that relay 1K1 is energized.

The principles underlying the battery charging system of the invention will now be described in connection with FIGURE 1 exemplifying a specific form of such system designed for charging and maintaining charged a nickel-cadmium battery consisting of a number of sealed battery cells which are to provide a reliable direct-current energy to certain operating devices, for example to certain aircraft instruments. However, similar battery charging systems of the invention are readily designed for supplying large direct-current (D.C.) power to large (D.C.) loads, for instance, where such load is normally supplied from a conventional A.C. three-phase power system through associated rectifier circuits, and a rechargeable nickel-cadmium battery of corresponding large D.C. power capacity is required for supplying such load in case the A.C. power supply is disabled.

The specific charging system described in connection with FIGURE 1 represents one specific example of the invention designed to maintain charged an airborne battery system and to operate from −20° F. up to 160° F. and up to 60,000 feet altitude. It comprises a storage battery 1B consisting of a number serially connected battery cells arranged to supply direct-current to a load (not shown) through two load leads 1L when the load switch is closed. For sake of reliability, nickel-cadmium battery cells are used. In the specific example, sufficient cells are connected in series to provide a normal battery D.C. voltage for instance 1.4 volt per cell. To recharge the battery after it has been partially or fully discharged and to maintain at all other times in fully charged condition, the opposite polarity battery terminates, namely the positive 1B(+) and negative charge conductor 1B(−) of the recharging circuit.

Charging power is supplied from a three-phase A.C. power supply 1C having three power supply conductors, to which are connected, for example, the three primary windings of a three-phase transformer 1C1 for delivering through its three-phase star connected secondary windings A.C. power of proper voltage to a conventional rectifier system 1C2 for supplying the required rectified D.C. charging current to the two opposite polarity charging conductors 1B(+), 1B(−). For conciseness sake, it is assumed that, at as to common subject matter, the description of the charging system of my copending application Ser. No. 192,936 filed May 7, 1962, now Patent No. 3,230,438, applies to the charging system of the present invention described herein.

In accordance with the invention, the charging system of FIGURE 1 is designed to recharge the battery 1B, at a constant current rate. Its recharging procedure is such as to assure that it fully charges the battery under all circumstances of cycling. It takes care of the specific requirements presented by the characteristics of nickel-cadmium battery cells. In such battery cells the charged active material of the positive electrode plate consists of nickel III hydroxide NiO(OH) which in discharging is converted to nickel (II) hydroxide Ni(OH)$_2$. The active material of the charged negative plate is composed of metallic cadmium which becomes cadmium hydroxide Cd(OH)$_2$ during the discharge.

A constant potential charging system cannot secure such full cell charging, since it is pegged to the 1.5 volts or at best to 1.6 volts per cell. To properly and fully charge the positive nickel hydroxide electrode body requires that 30 to 40% additional charge energy be delivered to the battery cell after the terminal voltage has risen to 1.5 volts per cell. The battery charging system of the present invention meets these difficulties and assures that each of the opposite polarity electrodes of Ni-Cd batteries are fully charged.

In accordance with the invention, the charging circuit is designed to charge the Ni-Cd battery at constant-current rate, and the charging operation is controlled by a charge totalizing means which is set into operation by sensing means 1A1 responsive to dropping battery voltage to start and totalize a main charge wherein the battery voltage is raised to a level corresponding to an initial recharging state, such as corresponds to 1.5 volt per cell. After so supplying the main charge the charging continues under the control of the totalizing means 17 for a followup topping charge which supplies a predetermined fraction of the preceding main charge, which topping charge assures, upon its completion that the positive plates of the battery are fully charged to the proper level of approximately 1.65 to 1.68 volts per cell and cause termination of the recharging operation with the termination of the topping charge.

In the specific charging system of the invention shown, charge totalizing means 50 is provided which totalizes the electric current of the main charge supplied to the battery, to the point where the battery has reached 1.5 volts per cell. The charge totalizing circuit has control means operative at the end of the main charge to cause the charge totalizing means to operate in a reverse direction and to return to its initial or "zero" state and to control in such reverse operation the amount of the additional topping charge supplied to the battery which bring the battery to its fully charged proper state.

As an example let us consider that from a nineteen cell battery, four ampere hours has been removed. The 19 cell battery may now be down to about 23 volts. This voltage is sensed by the internal logic of the battery charging system of the invention and causes the primary or main charge to be initiated, assuming that during the primary or main charge cycle of this example, an average current of approximately 3.5 amps supplied by successive 7 amps peak is delivered to the battery. The main charge is totalized by the forward operation of the charge totaling means. As the battery accepts charge and its voltage is raised to 1.5 volts per cell such voltage rise is sensed by the charger. As the main charge is completed the charging system is automatically set to continue a topping charge which is again totalized by the charge totalizer means in a topping setting whereby the battery is brought to its fully charged condition. The charging operation may be additionally controlled by temperature-sensitive means for increasing or decreasing the constant charging current in response to changes of the temperature of the battery. This assures compensation for temperature changes between the high and low end of the temperature range under which the battery has to operate.

In accordance with the invention the sequence of the main charge followed by topping charge is supplied to the battery only if the battery voltage drops below a predetermined low voltage level, and under control of sensing means responsive to a drop of the battery voltage, initiating recharging of the battery to the desired normal voltage; for example, 1.5 volt per cell, whereupon battery voltage-sensing means atop the so-initiated charging cycle. This arrangement simplifies the control of the charging operation. The charge totalizing means is utilized only in response to a drop of the battery voltage to a predetermined low level, for example, to 1.3 volts per cell, such as caused by battery discharge into a load.

The method for supplying constant current is a pulse-width regulation of the charging current of the system. Other means of current control could likewise be used. This system provides for a minimum of parts to achieve a ±10% regulation of the required average constant-current charge. The on to off time ratio of the regulating charge pulse-width circuit is inversely proportional to the difference between the D.C. output voltage from the rectified alternating current source and the battery voltage. If the line voltage should climb, the driving voltage around the charging loop is increased, the pulse-width decreases, maintaining the same average current flow to the battery.

In addition to its main charging mode and its topping charging mode, the charging system of FIG. 1 also operates in a trickle charging mode for maintaining the battery 1B fully charged while it floats across the two battery leads 1B(+), 1B(−) without delivering load current.

Across each of the three secondary windings of transformer 1C1 may be connected a protective shunt to provide a shunting bypass for high voltage transients induced therein and thus suppress damage to the components of the charging system. The protective shunts may consist of commercially available devices such as supplied by the General Electric Company under the trademark "Thyrector" and consisting of two back-to-back connected Zoner-type selenium rectifier junctions which block flow of current below the normal rectified D.C. voltage delivered to the two charge conductors 1B(+), 1B(−).

In the charging system above, superior transient protection is secured by connective across leads 1B(+) and 1C4 a Zener rectifier junction 1Z1 of predetermined breakdown voltage correlated to the rectified D.C. voltage. As an example, if the steady state D.C. rectified voltage is 52 volts, a Zener diode with a breakdown voltage of 60 volts gives good transient protection against transient surges transmitted by the A.C. power supply. Upon occurrence of disturbing line transient, the Zener diode 1Z1 avalanches at 60 volt and suppresses development of disturbing voltage transients across the charging circuit.

The charger shown is designed to operate from 3 phase 400 cycled ±10 cycles, 115 volts ± line to neutral.

The positive charge conductor 1B(±) connects the positive battery terminal head 1B(+) directly to the positive output terminal of the rectifier system. The negative terminal 1B(−) of the battery is connected to the negative rectifier output lead 1C4 of the charging power rectifier system through a saturable-core transistor oscillator which provides pulse-width regulation of the required constant charging current pulses delivered to battery 1B. In the form shown the saturable-core transistor oscillator comprises a conventional semiconductor junction transistor 1Q–1 having a base, emitter and collector electrodes, and saturable core transformer 1D2 having a primary winding 1D3 and a secondary winding 1D4.

The other circuit elements of the saturable core of oscillator will be explained in connection with following description of its operation. It is assumed that the oscillator transistor 1Q–1, and the other transistors of the system shown are all of the PNP Germanium type. If opposite polarity transistors are used the polarity of the circuit conductions are reversed in a conversional way. A rectified positive current pulse flows from (+) D.C. source to battery through the battery to lead 1B(−) through transformer winding 61 and through primary winding 1D4 to 1Q1 emitter to 1Q1 collector back to 1C–4 lead of the rectifier. This produces a current pulse through emitter collector of 1Q1 and primary transformer winding 1D4 which induces a current pulse in secondary transformer winding 1D3 which is applied to the base of collector base circuit and produces a direct current charging pulse into the battery. The current induced in the secondary transformer winding 1D3 flows through the circuit from one end of the winding through emitter base of 1Q1, to circuit elements 11, 13, 14, back to transformer winding 1D3.

The direct current charge pulse through primary transformer winding 1D4 increases until the core of transformer is saturated. Thereupon the transformer core flux ceases inducting voltage in the transformer secondary winding 1D3 and an opposite polarity voltage causing collapse of the transformer flux and ending of the ON time and starting the OFF time period of the oscillator.

The windings of transformer 1D2 are so connected that the *rising* D.C. in its primary windings causes its secondary winding current to bias its base so as to increase the emitter-collector current. This action causes rapid cumulative increase of flux and D.C. current flows through the battery charging circuit. As a result a charging current pulse having the shape of rectangular shape is delivered to the battery 1B during the ON time of each oscillation cycle and no current flow in the charging circuit during the OFF time of each oscillation cycle. These battery charging current pulses are generally similar to those shown in FIG. 1–A of my aforesaid prior co-pending application Ser. No. 192,936. The rectified-current supply circuit 1C–2 forms a complete circuit with the charging conductors 1B(+), 1B(−) and the battery 1B in a charging loop which sends a succession of constant current charging pulses into the battery as long as charging oscillator transistor 1Q1 is not *off* biased to stop its oscillations by a signal from sensing circuit, such as 1A1.

Auxiliary supply circuit 1C3 together with 20, 19, 18 provide a driving pulse to initiate each ON time pulse; without this pulse the 1Q1 oscillator would not conduct.

Diodes 11 and 13 suppress oscillations until a positive acting starting pulse is supplied by synchronous pulse circuit 1C–1 energized by the A.C. power system. Capacitors 16 and 17 suppress voltage spikes between the base of 1Q1 and 1B(+) lead. Resistance 121 and capacitor 18 serve as differentiating circuit for developing sharp oscillator starting pulses. Resistances 121 and 19 provide discharge path for capacitor 18. Rheostat 14 in the circuit connecting secondary transformer winding 1D–4 to supply circuit 1C–3 serves to adjust or set the ON time of the oscillator circuit.

The oscillator 1D will be set into oscillations each time a synchronizing pulse from A.C. power system is applied to the emitter of the oscillation transistor 1Q1 and then will deliver to the battery 1B a charging current pulse during the ON time of each oscillation cycle. These oscillations and such supply of battery charging pulses will continue unless an OFF-bias is applied to 1Q1 or otherwise positively stopped.

The charging system of my aforesaid U.S. patent has three sets of sensing circuit means for selectively starting and stopping charging oscillations in accordance with the changes in charging conditions of the charged battery as follows:

(a) Trickle or float sensing means responsive to drop of battery voltage below a desired normal level, such as 1.4 volt per cell. When the normal voltage level is again reached a stop signal is fed to the oscillator control circuit.

(b) Sensing means responsive to a large drop of the battery voltage, such as to 1.3 volt per cell, for starting a main charging operation followed by a topping charge operation; and (c) Additional sensing means responsive to restoration of the battery voltage, to the desired higher level, to stop the last described charging operations.

In accordance with the invention, the battery charging systems of the foregoing type are greatly simplified and given a higher order of reliability, by combining with it only one battery voltage sensing means for controlling the recharging of the battery in response to each substantial drain. In accordance with the invention, the charging system has, in addition to trickle charge or float mode sensing means for restoring small voltage drops caused by small current drain single additional battery voltage-sensing means responding to deeper battery voltage drop, such as to 1.3 volts per cell for starting a predetermined main charging operation, followed by a topping charge operation. Such additional sensing means responds to the ensuing recharging of the battery, to cause it to become reset so as to respond to the rise of the battery to a fully charged state, for instance to 1.5 volt per cell, for stopping this previously started charging operation. And such additional sensing means are now set to thereafter respond to the stopping of its previously started charging operation to become restored to its lower voltage setting and causing it to respond to the next or further low deep voltage drop or condition for starting another similar sequence of main charge and float charge operations.

In the *trickle charge or float mode* sensing means or circuits 1A3 respond to changes in the battery voltage from a desired or normal level, for example, of about 1.4 volt per cell, for removing the normally applied *off* bias from the charging oscillator transistor 1Q1 and recharging the battery when the voltage drops below 1.4 per cell, and restoring *off* bias to 1Q1 when the battery voltage is raised by charging to above 1.4 per cell.

FIG. 1 shows at 1A3 one example of a float charge sensing means. It comprises a transistor 1Q2 the base of which is connected to an intermediate portion of voltage divider resistors connected between the 1B(+) and 1B(−) leads and including resistances 1R2, 1R3 and 1R4 for adjusting the base bias. Zener diode 1Z3 is connected between emitter of 1Q2 and 1B(+) lead. Its collector is connected through a bias lead 1B4 including resistance 1R5 and diode 1D4 to base of charging oscillator 1Q1 for normally aplying thereto OFF bias and stop its oscillations and to apply thereto ON bias and cause it to charge the battery when its voltage drops below desired or normal level, such as 1.4 volt per cell. The parameters of the circuit elements of sensing circuit 1A3 are chosen in a conventional way to cause it to apply through its bias lead 1B4 off bias to base of charging oscillator transistor 1Q1 and prevent its oscillations in response to sensing normal battery voltage, such as above 1.4 volt per cell, and to start charging oscillations in response to battery voltage drop below such normal level.

In sensing circuit 1A3 of FIG. 1 the voltage divider resistor 1R2, 1R3, 1R4 in combination with Zener diode 1Z3 apply to diodes of sensing transistor 1Q2 a difference of voltage which causes the transistor to conduct and apply through bias lead 1B4 an *off* bias to charging transistor 1Q1 when the battery voltage rises above the selected normal level, such as 1.4 volt per cell. The adjustment is such that a drop of the battery voltage below such voltage or the control or breakdown voltage of Zener diode 1Z3 cause application of OFF bias to transistor 1Q2 and cuts its off-bias current through collector lead 1B-4 to base of charging transistor 1Q1 which thereupon starts and continues charging oscillation pulses.

In response to the battery voltage reaching normal level, the sensing circuit 1A3 causes its transistor 1Q2 to again apply normal blocking off-bias current to charging oscillator transistor 1Q1.

A substantial current drain from battery 1B, as by connection to a load, will produce a substantial drop of the battery voltage, for instance, down to 1.3 volt per cell. The charging system has main sensing means 1A1 responsive to such larger battery voltage drop, such as to 1.3 volt per cell, to actuate its relay contacts 1K1-1, 2, 3 to cause removal of the off-bias from charging oscillator transistor 1Q1 by opening contacts 1K3-13, 14. This causes charging of the battery with main charge mode followed by a topping mode of the charging operation. Throughout the duration of main charge mode, the oscillating charging circuit with oscillator transistor 1Q1 delivers to battery 1B a sequence of unidirectional pulses until the battery voltage is raised to its normal high level, for instance, 1.5 volt per cell.

In accordance with the invention, a battery charging system of the foregoing type is combined with charge totalizing means which totalizes the amount of the main charge delivered to the battery for raising the voltage to an initial level, and responsive thereto, the charge totalizing means are caused to operate in a reverse sense and return to an initial condition for totalizing a further topping charge delivered to the battery.

Any of the known coulometers which totalize the passing charge in a forward sense for measuring the total charge passing it in one direction and totalize an opposite charge passing in a reverse sense is suitable for charging systems of the invention.

FIGS. 3 and 4 show diagrammatically, as an example, one commercial form of coulometer 50 suitable for totalizing main and topping charges in a charging system of the invention. It comprises a small bore capillary tube 51 of glass, for instance, having sealed through terminals 52 at its opposite ends. The tube 50 is filled with a column of mercury 53 having a small transparent gap 54 filled with a bubble of suitable electrolyte which will electrolize mercury, for instance, potassium-iodide. Direct current flowing through the mercury column in the forward direction of arrow F will cause the mercury to dissolve in the electrolyte bubble 54. The mercury ions in bubble 54 are drawn by coulombic forces to the opposite sides of the electrolyte bubble 54 where the mercury ions are reduced and join the opposite sections of the mercury column. As a result the transparent electrolyte bubble will move from initial position at the left of FIG. 3 to the right position to indicate the quantity of charge delivered in the main charging mode.

There are also provided means responsive to the coulometer 50 having reached the end of its forward main charge totalizing action to cause it to reverse its charge totalizing action in reverse direction indicated by arrow R, with its transparent bubble 53 returning to the left (as seen in FIG. 3) and to totalize the topping charge supplied to the battery.

Referring to FIG. 1, a predetermined small fraction of the average charge current is supplied to the coulometer circuit 17-1 by including in series with the oscillator transformer primary winding 1D3 the primary winding 61 of an additional transformer having a secondary winding 62. The coulometer transformer secondary winding 62 is connected in series with coulometer 50 and relay switches contact pairs 1K3-6,7 and either 1K1-5,4 or 1K1-5,6, thorugh which the coulometer 50 is selectively connected either in series with MAIN branch circuit 44 or with TOPPING branch circuit 47, respectively. Relay contacts 1K1-5,4 complete the coulometer circuit through MAIN branch 44 which includes rectifier diode 45 and rheostat 46 for passing an adjusted predetermined fraction of MAIN charging current in *forward* direction through coulometer 50. In the opposite closed position, relay contacts 1K1-5,6 complete a corresponding reverse-flow circuit including oppositely polarity diode 48 and rheostat 49 for passing a predetermined fraction of TOPPING charging current in *reverse* direction through coulometer 50.

The control circuits of the charging system shown also comprise relays 1K1, 1K2 and 1K3, each having a set of contacts designated herein by the respective relay prefix. All these relays are shown in the de-energized condition of the respective relays except that relay 1K1 is energized.

In the coulometer device 50 of the charging system of FIG. 1, the small output of photocell 56 is amplified by a convention transistor amplifier circuit 1G1 operating with transistor 1Q4. The amplifier circuits of transistor 1Q4 are connected through operated relay contacts 1K3-13,14 to negative control supply lead 1C(—) and through closed relay contacts 1K1-1,2 to positive control supply lead 1C(+) for energizing relay 1K2 when the photocell is excited by the coulometer bubble 54 returning to its zero or initial position. Control supply leads 1C(+), 1C(—) are shown energized by direct current from a conventional auxiliary control supply 1CS used for low voltage relays having a supply voltage of 24 volts, for instance.

Suitable means associated with the coulometer 50 are responsive to such return to its initial position for causing it to stop the previously started MAIN and TOPPING charge sequences. In the example shown, a light source 55 and photocell 56 are placed on opposite sides at one end of capillary 51 to direct a beam of light onto photocell 56 and excite therein a resistance change when the reverse coulometer current has moved bubble 54 of coulometer 50 to its initial or zero position.

Referring to FIG. 1, coulomeetr sensing circuit means 1G1 are provided for controlling the MAIN charging operation of the system in response to the operation of the coulometer means 50. Coulometer sensing circuit 1G1 operates with a transistor 1Q4 in a manner analogous to above described FLOAT mode sensing circuit 1A1. Although it may be energized from the battery charging circuit it is shown as energized from an auxiliary direct current supply 1C, of 24 volts, for instance having a positive and negative supply lead 1C(+) and 1C(—) respectively. The coulometer sensing circuit is connected to coulometer supply conductors 1C(+) and 1C(—) respectively upon closure of the contact sets 1K3-6,7, 1K3-8,9 and 1K3-11,12. Between the two coulometer supply conductors 1C(+) and 1C(—) are connected in series the photocell resistance 56 and resistor 58 to the base of 1Q4. The emitter of transistor 1Q4 is connected through resistance 52 to negative supply 1C(—) and through voltage reference Zener diode 1Z4 to positive supply 1C(+). Coulometer relay means shown as coil 1K2 is connected between the collector of transistor 1Q4 and negative supply 1C(−). The parameters of the circuit elements and of the breakdown voltage of the Zener diode 1Z4 are so chosen and proportioned as to cause energization of coulometer relay 1K2 only in response to photocell 56 becoming excited in response to coulometer totalizing action being completed by return to its initial or zero condition.

In accordance with the invention, the MAIN sensing means 1A1 is arranged to sense and respond to a large voltage drop of the battery, for instance to 1.3 volt per cell, for starting a main oscillator charging operation consisting of an initial or main charge and a succeeding topping charge whereby the battery is brought to its full charge condition, and to respond to the battery voltage reaching its higher, fully charged condition to apply OFF bias to charging oscillator and stop its charging oscillations.

One example of such main sensing means will now be explaiend in connection with main sensing circuit 1A1 of FIG. 1. Except for the features of the invention described below the sensing circuit 1A1 has sensing circuit similar to those described above in connection with sensing section 1A3. It comprises a transistor 1Q5, the base of which is connected to intermediate point of voltage dividing resistors connected between positive supply lead 1B(+) and negative supply lead 1B(−) and including resistors 2R2, 2R3 and adjustable rheostat 2R4 for adjusting base bias. Zener diode 1Z5 is connected between emitter and 1B(+) lead. The 1Q5 collector is connected through relay coil 1K1 to 1B(−) lead for energizing and operating the relay upon transistor 1Q1 becoming on biased.

With sensing circuit 1A1 connected through closed relay contacts 1K3–1, 2 between 1B(+) and 1B(−) leads the parameters of their circuit elements of the just described part of circuit have been chosen to energize relay 1K1 in response to a deep battery voltage drop, for instance to 1.3 volt per cell. In accordance with the invention, this battery voltage-sensing circuit 1A1 is arranged to selectively include either bias adjusting rheostat 2R5 or the other bias adjusting rheostat 2R4 and be connected with it between 1B(+) and 1B(−) leads through the alternate closed relay contacts 1K3–3, 2 and adjusted to energize relay 1K1 when the rearranged sensing circuit senses and responds to a rise of the battery voltage to a desired fully charged level, for instance, 1.5 volt per cell.

An auxiliary relay means, namely charge relay 1K3 with associated contacts as described below is shown utilized for establishing the different circuit conditions with which the main charge and topping charge are selectively supplied to the battery under control of main charge sensing circuit 1A1. It is obvious that these relays may be replaced with other controlled switching means, such as transistors or other semi-conductor, or solid state control devices.

Other features of the system will be explained in connection with the following description of a battery charging operation under control of sensing means responding to a substantial drop of the battery voltage, for instance to 1.3 volt per cell, caused by, for instance, a large current drain from battery 1B.

The Truth Table of FIG. 2 shows the energization conditions of the main charge sensing relay 1K1, main charge relay 1K3, and charge or coulometer controlled relay 1K2 for each of the different operating conditions of the system. The first table column lists the relays 1K1, 1K2 and 1K3 and coulometer lamp. The upper table row lists the different operating conditions or modes of the charging system, namely float (as trickle charge), discharge (of battery), main charge, and the transitions between them. Energization of a relay is indicated by "X" and de-energization by "O."

*Float mode*

In the float mode, relay 1K1 is energized by sensing circuit 1A1 and the other relays 1K2 and 1K3 are de-energized, as seen in *Float* column of Truth Table, FIG. 2. As long as the battery 1B is subject only to leakage or small current drains which result in only limited drop of battery voltage—for instance, to 1.38 per cell—the *float mode* will prevail. In this mode, each limited drop of the battery voltage, caused by battery leakage or small user bleed current, will produce only limited drop of the normal battery voltage, for instance to somewhat below 1.38 volt per cell. Such limited battery voltage drop is sensed and responded to by sensing circuit 1A3, which thereupon removes the off bias from charging oscillator transistor 1Q1 and starts its charging oscillations for supplying the requisite small charge to battery 1B and this restores its normal battery voltage, for instance to above 1.4 volt per cell. The restored battery voltage is sensed and responded to by sensing circuit 1A3, which stops the charging oscillation by again supplying *off* bias to 1Q1.

*Discharge mode*

The user drains substantial battery current resulting in substantial drop of battery voltage, for instance to 1.3 volt per cell or less by connected load 60 to battery 1B by a load circuit 1L which may include a load switch.

*Main charge mode*

Such deep battery voltage drop, such as to 1.3 volt per cell, causes sensing circuit 1A1 to de-energize its relay 1K1. De-energized relay 1K1 closes its contact sets 1, 3 which energize charging relay 1K3 and its contact 6, 7 which prepare the circuit of the coulometer to receive a sampling of the charge current.

Energization of charging relay 1K3 causes the following sequence of events:

(a) Closes relay locking contacts 1K3–8, 9 which lock charging relay 1K3 in energized condition.

(b) Opens contacts 1K3–13, 14 removing the *OFF* bias from the base of charging transistor 1Q1 which is applied by sense control lead 1B4 from the float mode sensing circuit 1A3.

(c) Charging transistor 1Q1 proceeds to deliver charging current by the previously described pulse charging method to battery 1B.

(d) Energized relay 1K3 operates its relay contacts 1K3–2, 1 to the 1K3–2, 3 position to assure that relay 1K1 remains deenergized until the charging process raises the battery voltage to 1.5 volts per cell.

*Topping charge mode*

The recharging of battery 1B by the main charge mode will raise the battery voltage to a certain high level, for instance 1.5 volt per cell. Charge sensing circuit 1A1 responds to such battery voltage rise and energizes its relay 1K1.

Energized relay contacts 1K1–4, 5 switches coulometer sampling current from transformer secondary 62 to reverse sampling path through diode of 48. The charging oscillating transistor 1Q1 now supplies to battery 1B the topping charge which is sampled by coulometer 50 and causes bubble 54 to move in reverse direction toward its initial or zero coulometer position. The closed relay contacts 1K1–4, 5 also energizes coulometer lamp circuit. In addition closure of relay contacts 1K3–6, 7 has previously prepared the coulometer sensing circuit 17–1 for operation upon excitation of its sensing element or photo sensitive cell 56.

*End of topping mode*

The topping charge is being totalized by the reverse action of coulometer 50 until its bubble 54 is returned by reversed motion it to its zero position corresponding to the end of the topping mode. Upon the coulometer bubble reaching its zero position the sensing element causes energization of its photocell 56 and its amplifying circuit 1G1 causes relay 1K2 to be energized causing its contracts 1K2–1, 2 to de-energize charging relay 1K3. De-energized charging relay 1K3 in turn causes:

(a) Opening coulometer lamp circuit at 1K3–11, 12 contacts which deenergizes coulometer sensing relay 1K2;

(b) Closes bias circuit of charging oscillator transistor 1Q1 at 1K3–13, 14 contacts and stops charging; and (c) Restores charge sensing circuit 1A1 to its lower battery voltage sensing condition, i.e., to from 1.5 to 1.3 volt per-cell, by returning contacts 1K3–2,3 to 2,1 position shown.

The charging system is now returned to the float mode as indicated by the last columns of the Truth Table.

The examples of the battery charging system of the invention described above in connection with FIGS. 1 to 4 will suggest to those skilled in the art various modifications thereof. As an example, the various electrical relay switches for establishing the different control circuits may be replaced by transistor-type switches wherein the respective circuits are opened or closed by selective application of off-bias current and on-bias current or potential to the respective transistor switches. Similarly, the saturated-transformer-core constant-current supply oscillator of transistor 1Q1 may be replaced with known types of transistorized constant current supply sources having transistorized regulating means for delivering a regulated constant current from a direct-current supply the voltage of which may undergo the usual smaller or greater changes due to a load of changing internal impedance or voltage-current characteristics. As an example, such regulated constant current supply is described in the following publication:

Silicon Zener Diode Rectifier Handbook, Copyright 1961, by Motorola, Inc., chapter "Regulated Power Supplies" including pages 43 to 47; Electronik, 1960, No. 1, article starting on page 25, by H. Danklefsen and U. Hitz; Funktechnik, No. 17/1959, page 634, article on "Stabilized Power Supply Device for Transistors"; and Electronics Wld., vol. 61 (1959), page 60, article by P. J. Vogelsang on "Transistor-regulated power supply."

Since the charging system of the present invention charges the battery with constant current, or an average constant current, the constant charging current may be totalized with conventional timing means, instead with coulometer means as described above in connection with FIGURES 1 to 4.

The principles of the invention described in connection with examples thereof will suggest further modification of the invention and the claims shall not be limited to these examples.

I claim:

1. In a charging system for charging a battery to a predetermined raised charge level from opposite-polarity direct-current supply conductors, two opposite polarity charging conductors connected to opposite poles of said battery, charge means including a transistor circuit having at least one transistor with three unlike electrodes and connecting said two charging conductors to said supply conductors and means for producing a charge current flowing through said charge conductors to said battery, said charge means including a bias conductor connected to one of said transistor electrodes for selectively supplying to said charge means off-bias to stop flow of said charging current and on-bias to maintain flow of said charging current to said battery, said charge means comprising charge control means including charge totalizing means for totalizing the charge current supplied to said battery and sensing circuit means connected to said battery and responsive to a substantial battery-voltage drop below said level for applying through said bias conductor on-bias to said transistor and cause said charge means to supply charge to said battery under control of said control means, said charge totalizing means having connections causing said charge means to first supply to said battery a predetermined totalized main charge under control of said totalizing means and to thereafter supply to said battery predetermined totalized further charge correlated to said main charge under control of said totalizing means, said transistor circuits including connections from said supply conductors to two of said transistor electrodes and a transformer having a magnetic core with primary and secondary windings and connected through one of said windings and the third transistor electrodes to said battery, said core being saturated by rise of charging current through a winding thereof and inducing off-bias in its other winding for selectively supplying on-bias and off-bias to said transistor and producing continuous oscillation cycle of said transistor circuits for passing charging current in the on-bias time and stopping charging current in the off-bias time of each oscillation cycle.

2. In a battery charging system as claimed in claim 1, having said transistor circuits including settable circuit means for adjustably setting the duration of the on time of said transistor oscillation cycles and setting the average level of said charging current.

3. In a charging circuit as claimed in claim 1, said charge totalizing means comprising coulometer means for passing electric charge in one direction and for passing electric charge in opposite direction, said coulometer means having two opposite coulometer settings and responsive to flow of a predetermined charge in one direction to bring said coulometer means from one of said settings to the opposite setting and responsive to said predetermined charge flow in opposite direction for returning said coulometer to said one setting, said coulometer means being connected and responsive to flow of battery charging current of said main charge to cause said coulometer means to pass charging current in one direction and be brought from one of said coulometer settings to the opposite setting, and being connected and responsive to flow of charging current of said further charge to cause said coulometer means to pass charging current in a direction opposite to said one direction and be returned from said opposite setting to said one setting.

4. In a charging system for charging a battery with constant current to a predetermined raised charge level from opposite-polarity direct-current supply conductors, two opposite polarity charging conductors connected to opposite poles of said battery, charge means including a transistor circuit having at least one transistor with three unlike electrodes and connecting said two charging conductors to said two supply conductors and means for producing with current supplied to said supply conductors a substantially constant average charge current of selected level flowing through said charge conductors to said battery, said charge means including a bias conductor connected to one of said transistor electrodes for selectively supplying to said charge means off-bias to stop flow of said charging current and on-bias to maintain flow of said charging current to said battery, said charge means comprising charge control means including charge totalizing means for totalizing the charge current supplied to said battery and sensing circuit means connected to said battery and operative in response to a substantial battery-voltage drop below said level for applying through said bias conductor on-bias to said transistor and cause said charge means to supply charge to said battery under control of said control means, said charge totalizing means having connections causing charge means to first supply to said battery a predetermined totalized main charge under control of said totalizing means and thereafter supply to said battery predetermined totalized further charge correlated to said main charge under control of said totalizing means, said transistor circuits including connections from said supply conductors to two of said transistor electrodes and a transformer having a magnetic core with primary and secondary windings and connected through one of said windings and the third transistor electrodes to said battery, said core being saturated by rise of charging current through a winding thereof and inducing off-bias in its other winding for selectively supplying on-bias and off-bias to said transistor and producing continuous oscillation cycles of said transistor circuits for passing charging current in the on-bias time and stopping charging current in the off-bias time of each oscillation cycle.

5. In a battery charging system as claimed in claim 4, said transistor circuits including settable circuit means for adjustably setting the duration of the on time of said transistor oscillation cycles.

6. In a battery charging system as claimed in claim 4, said totalizing means comprising timer means for timing and totalizing the constant charging current flowing through said charging means to said battery and totalizing said main charge and said further charge.

7. In a charging system as claimed in claim 4, said charge totalizing means comprising coulometer means for passing electric charge in one direction and for passing electric charge in opposite direction, said coulometer means having two opposite coulometer settings and responsive to flow of a predetermined charge in one direction to bring said coulometer means from one of said settings to the opposite setting and responsive to said predetermined charge flow in opposite direction for returning said coulometer to said one setting, said coulometer means being connected and responsive to flow of battery charging current of said main charge to cause said coulometer means to pass charging current in one direction and be brought from one of said coulometer settings to the opposite setting, and being connected and responsive to flow of charging current of said further charge to cause said coulometer means to pass charging current in a direction opposite to said one direction and be returned from said opposite setting to said one setting.

References Cited

UNITED STATES PATENTS

| 2,310,700 | 2/1943 | Knight | 320—43 |
| 3,178,629 | 4/1965 | Saslow | 320—23 |
| 3,179,871 | 4/1965 | Bagno | 320—30 |
| 3,249,724 | 5/1966 | Hurvitz | 324—94 |

JOHN F. COUCH, *Primary Examiner.*

S. WEINBERG, *Assistant Examiner.*